United States Patent [19]

McCarthy et al.

[11] 3,819,867

[45] June 25, 1974

[54] MATRIX EMPLOYING SEMICONDUCTOR SWITCHING CIRCUIT

[75] Inventors: Jeremiah P. McCarthy, North Bellmore, N.Y.; William Salmre, Norwalk, Conn.

[73] Assignee: GTE Laboratories Incorporated, Waltham, Mass.

[22] Filed: Oct. 12, 1971

[21] Appl. No.: 188,164

[52] U.S. Cl. .......................... 179/18 GF, 340/166 R
[51] Int. Cl. .......................... H04q 3/50
[58] Field of Search ............ 179/18 GF; 340/166 R; 307/252 J, 252 K, 299; 317/235 Z

[56] References Cited

UNITED STATES PATENTS

| | | | |
|---|---|---|---|
| 3,251,036 | 5/1966 | Smith | 179/18 GF |
| 3,456,084 | 7/1969 | Haselton | 179/18 GF |
| 3,487,323 | 12/1969 | Schaefer | 330/30 D |
| 3,531,773 | 9/1970 | Beebe | 179/18 GF |
| 3,542,963 | 11/1970 | Aagaard | 179/18 GF |
| 3,564,291 | 2/1971 | Aagaard | 307/252 J |
| 3,566,154 | 2/1971 | Loessi | 317/235 Z |
| 3,601,547 | 8/1971 | Potter | 179/18 GF |
| 3,633,052 | 1/1972 | Hanna | 317/235 Z |
| 3,694,812 | 9/1972 | Enomoto | 340/166 R |
| 3,781,484 | 12/1973 | Macrander | 179/18 GF |

FOREIGN PATENTS OR APPLICATIONS

| | | | |
|---|---|---|---|
| 1,511,705 | 12/1967 | France | 179/18 GF |

*Primary Examiner*—Thomas W. Brown
*Attorney, Agent, or Firm*—David M. Keay; Irving M. Kriegsman

[57] ABSTRACT

Crosspoint switching array, each crosspoint switching circuit including silicon controlled switches for connecting signal lines of one group to signal lines of another group. Each switching circuit includes a multiple-collector transistor having its emitter connected directly to the control line of one group of lines and its base connected directly to the control line of one group of lines and its base connected directly to the control line of the other group. The gate electrode of each silicon controlled switch is connected through a blocking diode to separate collector electrodes of the multiple-collector transistor. Coincident pulses on the control lines cause current to flow in the transistor thereby switching the silicon controlled switches to conduction and providing signal paths between the two groups of lines.

6 Claims, 3 Drawing Figures

MATRIX EMPLOYING SEMICONDUCTOR SWITCHING CIRCUIT

BACKGROUND OF THE INVENTION

This invention relates to switching circuits. More particularly, it is concerned with solid state switching circuits for use in crosspoint switching arrays.

Crosspoint switching arrays employing solid state devices have been developed for use in switching networks in communication systems. Switching arrays employing controlled latching semiconductor devices such as silicon controlled rectifiers (SCR) and silicon controlled switches (SCS) are described and claimed in U.S. Pat. No. 3,456,084 entitled "Switching Network Employing Latching Type Semiconductors" issued on July 15, 1969, to Ernest F. Haselton, Jr.

With the advent of techniques for producing monolithic integrated circuit networks within a single body of semiconductor material, it has become desirable to employ switching circuits for crosspoint arrays which are amenable to fabrication as monolithic integrated circuits. Integrated circuits should employ a minimum number of components and the individual components should be small in order that the number of circuits fabricated within a given semiconductor body can be large.

SUMMARY OF THE INVENTION

In improved crosspoint switching arrays in accordance with the present invention, the number of components is reduced by combining and eliminating components, and the arrays are readily amenable to fabrication in monolithic integrated circuit form. The crosspoint array establishes particular signal transmission paths between selected transmission line groups of first and second sets of transmission line groups. Each transmission line group of the first set is associated with each transmission line group of the second set at separate ones of a multiplicity of crosspoints, and each transmission line group has at least two signal lines and a control line.

The switching array includes a controlled latching semiconductor device, such as an SCR or an SCS, for each signal transmission path between a transmission line group of the first set and a transmission line group of the second set at each crosspoint. Each of the controlled latching semiconductor devices has a first and a second signal electrode and a gate electrode. The first and second signal electrodes are connected between signal lines in the first and second sets of transmission line groups. A resistance is connected between the gate electrode and the second signal electrode of each of the controlled latching semiconductor devices.

At each crosspoint there is a transistor device having an emitter electrode for connecting to the control line of the transmission line group of one of the sets of transmission line groups and a base electrode for connecting to the control line of the transmission line group of the other of the sets of transmission line groups. The transistor device has a multiplicity of separate collector electrodes, each one connected to the gate electrode of a different one of the controlled latching semiconductor devices at the crosspoint. All current flow between the control lines at the crosspoint is caused to flow across the emitter-base junction of the transistor device thereby causing collector current to flow into the gate electrodes of the controlled latching semiconductor devices at the crosspoint.

A blocking means is connected between the gate electrode of each controlled latching semiconductor device and the associated collector electrode of the transistor device in order to block the flow of current along the path from the signal line connected to the first signal electrode of the semiconductor device, into the semiconductor device, from the gate electrode to the collector electrode, through the transistor device, and from the base electrode of the transistor device to the control line connected to the base electrode. The blocking means prevent the flow of transient leakage currents during switching as will be explained hereinbelow.

When coincident pulses are applied to selected control lines of the first and second sets of transmission line groups, current is caused to flow through the transistor devices at the crosspoints selected by the particular control lines. Current flows from the transistor devices to the gate electrodes of associated controlled latching semiconductor devices thereby establishing particular signal transmission paths between the selected transmission line groups through those controlled latching semiconductor devices.

BRIEF DESCRIPTION OF THE DRAWING

Additional objects, features, and advantages of switching circuits in accordance with the invention will be apparent from the following detailed discussion together with the accompanying drawing wherein.

DETAILED DESCRIPTION OF THE INVENTION

Figure 1:
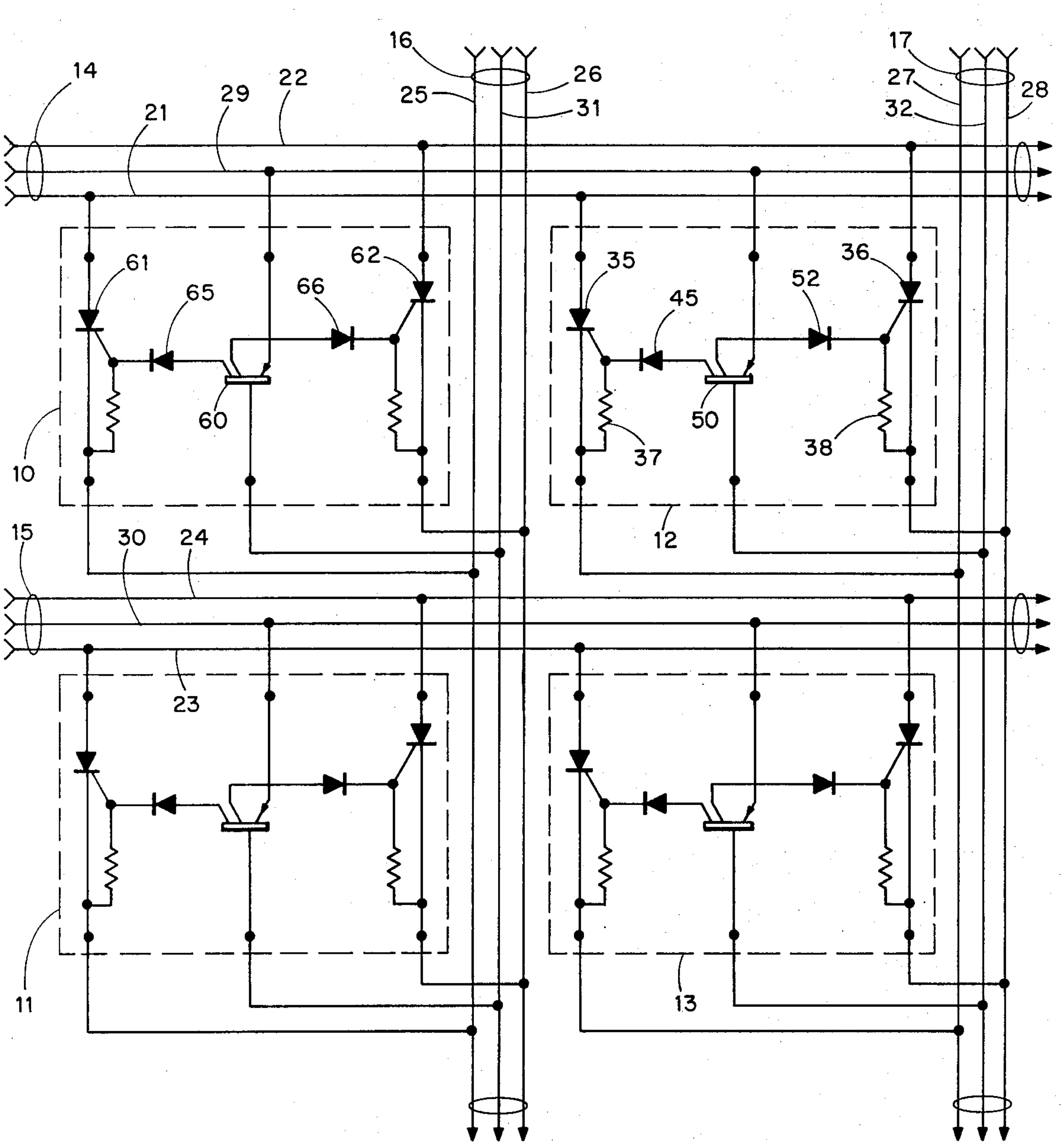
FIG. 1 is a schematic circuit circuit diagram of a 2-by-2 matrix from an array of crosspoint switching circuits in accordance with the present invention.

Shown in the drawing is a switching array which for simplicity is illustrated as a 2-by-2 matrix of switching crosspoints. The crosspoint switching elements 10, 11, 12, and 13 may be fabricated as monolithic integrated circuits in a single body of semiconductor material. With the array as illustrated, either the first or second group of transmission lines 14 and 15 of a first set can be connected to either the first or second transmission line group 16 and 17 of a second set as desired. That is, any transmission line group 14 or 15 of the first set may be connected to any transmission line group 16 or 17 of the second set by activation of the appropriate crosspoint switching circuit 10, 11, 12, or 13. Each of the transmission line groups 14, 15, 16, and 17 as illustrated includes two signal lines 21 and 22, 23 and 24, 25 and 26, and 27 and 28, and a single control line 29, 30, 31, and 32, respectively.

All the crosspoint switching circuits 10, 11, 12, and 13 of the array are identical. For illustrative purposes, the crosspoint switching circuit 12 of the matrix which when activated serves to connect the first transmission line group 14 of the first set with the second transmission line group 17 of the second set will be described in detail. The switching circuit 12 includes a first silicon controlled switch (SCS) 35 with its anode connected directly to signal line 21 of the first transmission line group 14 of the first set and with its cathode connected directly to signal line 27 of the second transmission line group 17 of the second set. Similarly, a second silicon controlled switch 36 has its anode connected to the other signal line 22 of the first transmission line group 14 of the first set and its cathode connected directly to the other signal line 28 of the second transmission line group 17 of the second set. A resistance 37 is connected between the control or gate electrode and the cathode electrode of the first silicon controlled switch 35, and a second resistance 38 is similarly connected between the gate electrode and the cathode electrode of the second silicon controlled switch 36.

A multiple-collector PNP transistor 50 has its emitter connected directly to the control line 29 of the first transmission line group 14 of the first set and its base connected directly to the control line 32 of the second transmission line group 17 of the second set. One collector of the transistor 50 is connected through a diode 45 to the gate electrode of the first silicon controlled switch 35, and the other collector electrode is connected through a diode 52 to the gate electrode of the second silicon controlled switch 36. The multiple-collector transistor 50 has a single emitter-base junction through which all current flowing between control lines 29 and 32 must flow and a base-collector junction for each silicon controlled switch.

Figure 2:
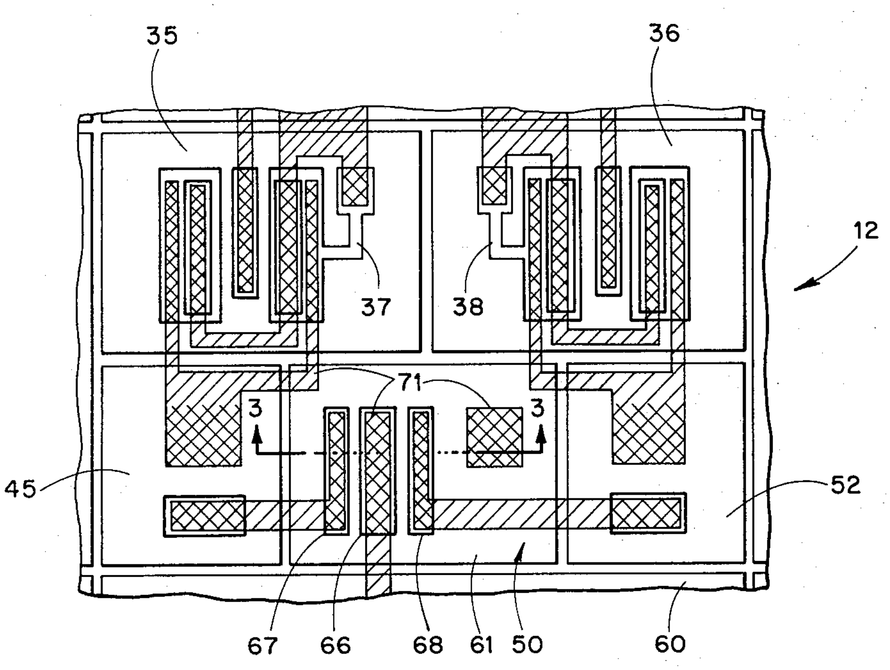
FIG. 2 is a plan view of a fragment of a wafer of semiconductor material illustrating the switching circuit of FIG. 1 embodied in a monolithic integrated circuit network.
Figure 3:
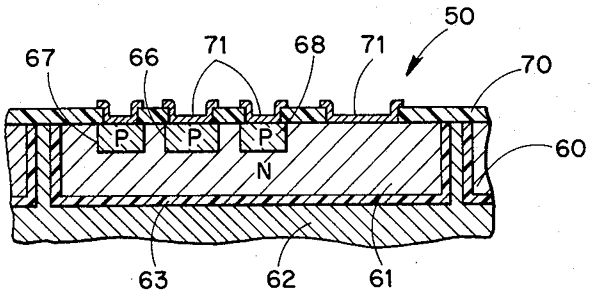
FIG. 3 is an elevational view in cross-section of a portion of the fragment taken along the line 3—3 of FIG. 2.

FIG. 2 is a plan view illustrating the circuit 12 in monolithic integrated circuit form. The circuit components are fabricated in a portion of a wafer 60 of silicon by employing well known selective diffusion techniques. The transistor device 50 is shown in detail in cross-section in FIG. 3. The transistor device 50 includes an N-type base region 61 on a polycrystalline substrate 62. The base region is electrically isolated from the remainder of the wafer by an encircling dielectric layer of silicon dioxide 63, and has a surface area in the surface of the wafer.

A P-type emitter region 66 is located within the base region 61. First and second P-type collector regions 67 and 68 are set within the base region 61. Both collector regions 67 and 68 and the emitter region 66 are formed in the wafer during the same P-type diffusion step. The surface of the wafer is covered with an insulating protective coating of silicon oxide 70. Conductive leads 71 formed on the surface of the silicon oxide coating 70 by vacuum deposition and selective etching techniques make ohmic contact to the desired portions of the surface areas of the device regions at openings in the oxide coating.

The two collector regions 67 and 68 are equal in size, configuration, and resistivity profile. They are located such that each has the same physical relationship to the emitter region 66. Thus, the electrical characteristics of the two collectors of the transistor device are substantially identical.

The switching circuit 12 operates in the following manner to provide signal paths between the first transmission line group 14 of the first set and the second transmission line group 17 of the second set. Under quiescent conditions, the silicon controlled switches 35 and 36 are non-conducting and provide a high impedance thus isolating the two transmission line groups from each other. A suitable biasing potential is applied between the signal lines 21 and 27 and between signal lines 22 and 28 by appropriate external circuitry (not shown) to forward bias the silicon controlled switches 35 and 36, respectively, below their breakdown potential.

In order to switch the silicon controlled switches 35 and 36 to their conducting conditions and thus establish signal paths through the switching circuit 12, momentary pulses are simultaneously applied to control lines 28 and 32, a positive-going pulse on control line 29 and a negative-going pulse on control line 32. The coincident pulses are of sufficient magnitude to forward bias the transistor 50 to conduction; and current flows between the control lines 29 and 32 and across the emitter-base junction of the transistor causing the transistor to conduct. Since neither of the two pulses alone is sufficient to forward bias the emitter-base junction of a transistor, the transistors in the other switching circuits 10, 11, and 13 of the array do not conduct. Collector current in the two collectors of the transistor 50 flows separately through the diodes 45 and 52, the polarities of which are such as to permit normal collector current flow, and into the gate electrodes of the silicon controlled switches 35 and 36, respectively.

The flow of current to the gate electrodes of the silicon controlled switches 35 and 36 initiates turn-on of these devices, and current flows through the forward-biased silicon controlled switches from the signal lines of the first transmission line group 14 of the first set to the respective signal lines of the second transmission line group 17 of the second set. The biasing potential on the signal lines is such that the current which flows through each silicon controlled switch upon turn-on is greater than the minimum holding current. The external circuitry is capable of supplying current in excess of the minimum holding current, and thus the silicon controlled switches remain in the ON, or conducting, condition after termination of the momentary pulses on the control lines. The low impedance of the silicon controlled switches in their conducting condition provides direct paths for signals between the first transmission line group 14 of the first set and the second transmission line group 17 of the second set.

The transmission line groups 14 and 17 are disconnected from each other by resetting the switching circuit 12 to its quiescent condition. Any of various techniques which reduce the current through the silicon controlled switches below the minimum holding current necessary to maintain conduction may be employed. For example, the current supplied by the external biasing circuitry may be interrupted or otherwise reduced to below the level necessary to sustain conduction in the silicon controlled switches, and the silicon controlled switches return to their non-conducting condition.

By virtue of the close control of dimensions possible with integrated circuit fabrication techniques, the collector regions of the transistor, and thus their electrical characteristics, are essentially identical. Therefore, resistances are not required in the emitter or base current paths in order to overcome differences in the electrical characteristics of the collectors, and balanced turn-on conditions for the two silicon controlled switches are obtained without these resistances. Since there are no resistances in the current paths between the control lines, there are no power losses along these current paths due to resistance. Furthermore, in monolithic integrated circuits resistances are relatively large components, thus the space occupied by each circuit may be relatively small.

The diodes 45 and 52 serve as blocking diodes to prevent transient signal leakage paths during switching of other switching circuits of the array. For example, it is assumed that switching circuit 12 is activated connecting the first transmission line group 14 of the first set to the second transmission line group 17 of the second set. Then, if a connection is to be made between the first transmission line group 16 of the second set and some transmission line group of the first set, other than the first transmission line group 14, a negative-going pulse is applied to the control line 31 of the first transmission line group 16 of the second set. Since signal and bias voltages are present on signal lines 21 and 22, the negative-going pulse at the base of transistor 60 of switching circuit 10 might be sufficient to forward bias the anode-to-gate of each silicon-controlled switch 61 and 62 and the collector-to-base junctions of the associated transistor 60 causing current to flow from the signal lines 21 and 22 to the control line 31. However, the blocking diodes 65 and 66 are arranged to block current flow in this direction thus preventing leakage current of this nature. Furthermore, without the blocking diodes, heavy current, limited only by external circuitry, could flow in the anode-to-gate of each silicon controlled switch and the associated collector-to-base of the transistor device during the turn-on pulse.

Although the communication system as illustrated in the drawing is a two-wire balanced-to-ground configuration, the switching circuit as shown may be modified for use with other configurations. For example, with three or more signal lines in each transmission line group, each switching circuit includes a silicon controlled switch for each path between signal lines and the transistor has an equal number of collector electrodes arranged so as to provide substantially identical electrical characteristics.

Crosspoint switching arrays as shown may be employed in multi-stage switching systems in accordance with known techniques in the communication switching art, for example, as described in the aforementioned patent to Haselton.

Thus, while there has been shown and described what is considered a preferred embodiment of the present invention, it will be obvious to those skilled in the art that various changes and modifications may be made therein without departing from the invention as defined by the appended claims.

What is claimed is:

1. A crosspoint switching array for establishing particular signal transmission paths between selected transmission line groups of first and second sets of transmission line groups, each transmission line group of the first set being associated with each transmission line group of the second set at separate ones of a multiplicity of crosspoints, each transmission line group having at least two signal lines and a control line; said switching array comprising a controlled latching semiconductor device for each signal transmission path between a transmission line group of the first set and a transmission line group of the second set at each crosspoint, each of said semiconductor devices having first and second signal electrodes and a gate electrode, the first and second signal electrodes being adapted to be connected between signal lines in said first and second sets of transmission line groups;

a resistance for each controlled latching semiconductor device connected between the gate electrode and the second signal electrode of the associated semiconductor device;

a transistor device at each crosspoint having a single emitter electrode for connecting only to the control line of the transmission line group of one set of transmission line groups, a single base electrode for connecting only to the control line of the transmission line group of the other of the sets of transmission line groups, and at least two collector electrodes, a separate collector electrode being connected to the gate electrode of each of the controlled latching semiconductor devices at the crosspoint, the only path for current flow between the control lines at the crosspoint being across the emitter-base junction of the transistor device at the crosspoint; and a blocking means connected in series between the gate electrode of each controlled latching semiconductor device and the associated collector electrode of said transistor device for blocking the flow of current along a path from the signal line connected to the first signal electrode of the controlled latching semiconductor device, into the controlled latching semiconductor device, from the gate electrode to the collector electrode, through the transistor device, and from the base electrode of the transistor device of the control line connected to the base electrode;

each blocking means being connected only to the juncture of the gate electrode and the resistance and to the associated collector of the transistor device;

the application of coincident pulses to selected control lines of said first and second sets of transmission line groups causing current flow through the transistor devices at the selected crosspoints, thereby causing collector current to flow into the gate electrodes of the associated controlled latching semiconductor devices and establishing particular signal transmission paths between the selected transmission line groups.

2. A crosspoint switching array in accordance with claim 1 wherein each of said controlled latching semiconductor devices has a conducting condition and a non-conducting condition and is operable to be biased in the non-conducting condition so as to cause switching to the conducting condition in response to a momentary flow of current to the gate electrode whereby the flow of collector current from the associated transistor device switches the controlled latching semiconductor device to the conducting condition providing a signal transmission path therethrough.

3. A crosspoint switching array in accordance with claim 2 wherein each blocking means includes a diode connected only to the juncture of the gate electrode of the associated controlled latching semiconductor device and the resistance and to the associated collector electrode of the transistor device and operable to permit normal collector current flow and to block current flow in the reverse direction.

4. A crosspoint switching array in accordance with claim 3 wherein the emitter electrode of the transistor device is adapted to be directly connected only to the control line of the transmission line group of the one set of transmission line groups;

the base electrode of the transistor device is adapted to be directly connected only to the control line of the transmission line group of the other of the sets of transmission line groups; and each diode is connected directly only to the juncture of the gate electrode of the associated controlled latching semiconductor device and the resistance and to the associated collector electrode of the transistor device.

5. A semiconductor integrated circuit network comprising a wafer of semiconductor material having fabricated therein first and second controlled latching semiconductor devices each having first and second signal electrodes and a gate electrode;

first and second resistances;

a transistor device having a single emitter electrode, a single base electrode, and two collector electrodes; and first and second diodes;

conductive means connecting one end of the first resistance to the second signal electrode of the first controlled latching semiconductor device;

conductive means connecting the other end of the first resistance to the gate electrode of the first controlled latching semiconductor device;

conductive means connecting one end of the second resistance to the second signal electrode of the second controlled latching semiconductor device;

conductive means connecting the other end of the second resistance to the gate electrode of the second controlled latching semiconductor device;

conductive means connecting one electrode of the first diode only to the conductive means connecting the other end of the first resistance to the gate electrode of the first controlled latching semiconductor device;

conductive means connecting the other electrode of the first diode only to one of the collector electrodes of the transistor device;

the conductive means being connected to the electrodes of the first diode in a manner to permit normal collector current flow and to block current flow in the reverse direction;

conductive means connecting one electrode of the second diode only to the conductive means connecting the other end of the second resistance to the gate electrode of the second controlled latching semiconductor device;

conductive means connecting the other electrode of the second diode only to the other collector electrode of the transistor device;

the conductive means being connected to the electrodes of the second diode in a manner to permit normal collector current flow and to block current flow in the reverse direction;

conductive means connected to the first signal electrodes of the first and second controlled latching semiconductor devices and adapted to be connected to signal lines of a transmission line group of a first set;

conductive means connected to the second signal electrodes of the first and second controlled latching semiconductor devices and adapted to be connected to signal lines of a transmission line group of a second set;

conductive means connected to the emitter electrode of the transistor device and adapted to be connected only to a control line of said transmission line group of the first set; and conductive means connected to the base electrode of the transistor device and adapted to be connected only to a control line of said transmission line group of the second set.

6. A semiconductor integrated circuit network in accordance with claim 5 wherein said transistor device includes a base region of semiconductor material of one conductivity type in said wafer of semiconductor material and having a surface area in a surface of said wafer;

a base contact of ohmic connection with a portion of the surface area of the base region;

an emitter region of semiconductor material of the opposite conductivity type encircled by material of the base region and having a surface area in the surface of said wafer;

an emitter contact in ohmic connection with a portion of the surface area of the emitter region;

a first collector region of semiconductor material of the opposite conductivity type encircled by material of the base region and having a surface area in the surface of said wafer;

a first collector contact in ohmic connection with a portion of the surface area of the first collector region;

a second collector region of semiconductor material of the opposite conductivity type encircled by material of the base region and having a surface area in the surface of said wafer; and a second collector contact in ohmic connection with a portion of the surface area of the second collector region;

said first and second collector region being of substantially equal size and configuration and each being located in substantially identical physical relationship with respect to the emitter region whereby the electrical characteristics of the collector regions are substantially identical.

* * * * *